United States Patent
White et al.

(10) Patent No.: US 12,463,889 B2
(45) Date of Patent: Nov. 4, 2025

(54) COMMUNICATION NETWORK FOR MONITORING A CHAIN BASED NETWORK

(71) Applicant: Tyco Electronics UK Ltd, Swindon (GB)

(72) Inventors: Dominic Charles White, Cambridgeshire (GB); Jonathan D. Roberts, Cambridgeshire (GB); Tautvydas Mickus, Klaipeda (LT); Paul D. Mitchell, York (GB); David Grace, York (GB); Yi Chu, York (GB)

(73) Assignee: TYCO ELECTRONICS UK LTD, Swindon (GB)

( * ) Notice: Subject to any disclaimer, the term of this patent is extended or adjusted under 35 U.S.C. 154(b) by 641 days.

(21) Appl. No.: 16/158,943

(22) Filed: Oct. 12, 2018

(65) Prior Publication Data

US 2020/0120010 A1 Apr. 16, 2020

(51) Int. Cl.
| | | |
|---|---|---|
| *H04L 12/26* | (2006.01) | |
| *H04L 5/00* | (2006.01) | |
| *H04L 43/10* | (2022.01) | |
| *H04W 56/00* | (2009.01) | |
| *H04W 72/04* | (2023.01) | |
| *H04W 72/0446* | (2023.01) | |

(52) U.S. Cl.
CPC ............ *H04L 43/10* (2013.01); *H04L 5/0055* (2013.01); *H04W 56/001* (2013.01); *H04W 72/0446* (2013.01)

(58) Field of Classification Search
CPC ... H04L 5/0055; H04L 67/1001; H04L 43/12; H04L 67/1008; H04L 43/0817; H04L 41/0213; H04L 41/0659; H04L 43/20; H04W 56/001; H04W 72/0446; H04W 24/02; H04W 8/005; H04W 84/18; H04B 3/46; H04B 3/56; H04B 2203/5491; Y04S 40/00
See application file for complete search history.

(56) References Cited

U.S. PATENT DOCUMENTS

| | | | | |
|---|---|---|---|---|
| 5,583,734 A * | 12/1996 | McMills | ................... | H01C 7/12 361/111 |
| 5,680,289 A * | 10/1997 | Robinson | ................ | H01C 7/126 338/21 |
| 5,721,663 A * | 2/1998 | Smith | ........................ | H01T 1/14 361/111 |
| 5,721,664 A * | 2/1998 | Uken | ........................ | H01C 8/04 361/127 |
| 7,423,985 B1* | 9/2008 | Hill | ........................ | H04W 84/18 370/310.1 |
| 7,466,225 B2 | 12/2008 | White, II et al. | | |

(Continued)

OTHER PUBLICATIONS

International Search Report for International Application No. PCT/IB2019/001128, dated Jan. 27, 2020.

*Primary Examiner* — Muhammad Raza (57) ABSTRACT

A communication network for monitoring node state within a chain based network that includes a first base-station configured to transmit a ping signal and a plurality of nodes each configured to receive the ping signal, send an acknowledgement signal upon receipt of the ping signal and transmit the ping signal. The communication network also includes a second base-station configured to receive the ping signal and transmit data related to the plurality of nodes based on the ping signal.

7 Claims, 8 Drawing Sheets

(56) References Cited

U.S. PATENT DOCUMENTS

| | | | |
|---|---|---|---|
| 8,595,550 B1* | 11/2013 | Heath | H04L 12/10 |
| | | | 714/14 |
| 8,872,629 B2 | 10/2014 | Ziegler | |
| 10,506,661 B2 | 12/2019 | Qin | |
| 10,523,515 B2 | 12/2019 | Hunkeler et al. | |
| 10,531,499 B2 | 1/2020 | Hole et al. | |
| 10,536,951 B2 | 1/2020 | Kahtava et al. | |
| 10,548,174 B2 | 1/2020 | Wei et al. | |
| 11,102,754 B2* | 8/2021 | Martin | H04W 76/11 |
| 2005/0243495 A1* | 11/2005 | Ramarge | H01C 7/12 |
| | | | 361/118 |
| 2005/0249215 A1* | 11/2005 | Kelsey | H04L 45/52 |
| | | | 370/392 |
| 2007/0191109 A1* | 8/2007 | Crowder | A63F 9/24 |
| | | | 463/42 |
| 2008/0016206 A1* | 1/2008 | Ma | H04L 67/1001 |
| | | | 709/224 |
| 2011/0304943 A1* | 12/2011 | Barton | H02H 9/042 |
| | | | 361/104 |
| 2013/0221932 A1* | 8/2013 | Lee | H02J 7/00 |
| | | | 320/149 |
| 2014/0176336 A1* | 6/2014 | Li | G01R 31/52 |
| | | | 340/870.01 |
| 2014/0269266 A1* | 9/2014 | Filsfils | H04L 43/50 |
| | | | 370/228 |
| 2015/0103830 A1* | 4/2015 | Kampmann | H04L 45/64 |
| | | | 370/392 |
| 2015/0146600 A1* | 5/2015 | Yang | H04W 52/0216 |
| | | | 370/311 |
| 2015/0263785 A1* | 9/2015 | Farrokhi | H04B 3/54 |
| | | | 375/257 |
| 2016/0142291 A1* | 5/2016 | Polland | H04L 43/10 |
| | | | 370/392 |
| 2017/0126572 A1* | 5/2017 | Sharma | H04L 47/2416 |
| 2017/0127302 A1* | 5/2017 | Fersman | H04L 69/28 |
| 2018/0375425 A1* | 12/2018 | Sheng | H02M 1/34 |
| 2018/0375825 A1* | 12/2018 | Nataraja | H04L 43/10 |
| 2019/0186952 A1* | 6/2019 | Schwartz | H02J 3/003 |
| 2021/0314962 A1* | 10/2021 | Ashraf | H04B 17/309 |

* cited by examiner

COMMUNICATION NETWORK FOR MONITORING A CHAIN BASED NETWORK

BACKGROUND OF THE INVENTION

The subject matter herein relates generally to a communication network for monitoring node state within a chain based network.

There are many applications for using a communication network to monitor for faults and failures within chain based networks. Chain based networks can include, power or transmission lines, river/canal networks including on-land and underwater, coastline networks, including on-land and underwater networks, under-water cable networks, road/motorway/highway networks, railways, hill/cliff side networks, street light networks, passing information through a chained low-power satellite network in similar orbits with minimal deviation, or the like.

One example application is within transmission lines, also known as power lines. The transmission lines are within a power network and extend from transmission tower to transmission tower to conduct alternating current across large areas. Great care must be taken in the maintenance and use of these lines. When over-current conditions occur from lighting strikes, surges, broken transmission lines, or the like, significant consequences result.

Surge arresters are utilized on transmission lines to prevent power outages due to over-current conditions by safely dumping the current into the earth, thus minimizing disturbance to a power network. When the life of a surge arrester ends, or a surge arrester malfunctions, often this occurs in a remote location where the failed arrester is not noticed or detected until many months pass. This leaves a portion of the line unprotected for long periods until the failed unit is replaced.

Specifically, when a surge arrestor fails, the failure causes a short between the power network and ground causing an outage and at the very least a requirement to reset the circuit breakers in the system. To prevent this from happening a disconnect is used in series with the surge arrestor. In normal operation the disconnect is passive, but when the surge arrestor fails, a high current flows through the surge arrester to the ground. At this point the disconnect blows apart protecting the transmission line from the surge while providing a visual indicator that the surge arrestor has failed through an earth strap that is now dangling from the arrestor or tower. While damage or outage as a result of the surge arrestor failure is prevented for this initial surge condition, the surge arrestor still has failed in that part of the transmission line, and the transmission line is no longer protected from lightning events or other over-current conditions.

Therefore, in order to detect failed surge arresters so that they may be replaced before there is a need for their use, vehicles, such as helicopters are utilized for sight checks in order find blown apart disconnects to detect surge arrester failures. Alternatively, power companies must rely on non-employees to report such failed arresters. Specifically, blown apart pieces of the disconnect must be found by such sight inspections. This ultimately leads to untimely repair and replacement of arresters, causing line failures and outages. Thus, there is a need for an improved powerline monitoring or detection of surge arrester failure, ideally providing rapid and automated notification of a failure. Such an improved powerline monitoring detection is required without significant cost or power consumption.

BRIEF DESCRIPTION OF THE INVENTION

In one embodiment, a communication network for monitoring node state within a chain based network is provided. The communication network includes a first base-station configured to transmit a ping signal. The communication network also includes a plurality of nodes each configured to receive the ping signal, send an acknowledgement signal upon receipt of the ping signal and transmit the ping signal, and a second base-station configured to receive the ping signal and transmit data related to the plurality of nodes based on the ping signal.

In another embodiment, a method is provided for monitoring node state within a chain based network. The method includes periodically transmitting a ping signal from a first base-station, and periodically powering a first node during a frame wherein when powered the first node receives the ping signal. The powering of the first node during the frame is synchronized with the periodic transmission of the ping signal from the first base-station upon receiving the ping signal at the first node. The method also includes sending an acknowledgement signal from the first node to the first base-station upon receiving the ping signal at the first node, and transmitting the ping signal from the first node to a second node upon receiving the ping signal at the first node. The ping signal is transmitted from the first node to a third node upon receiving the ping signal at the first node after failure of the second node, and the ping signal is received at a second base-station. When the ping signal is received at the second base-station, the ping signal includes data related to the failed second node.

In yet another embodiment a method of monitoring node state within a surge arrester in a network of surge arrestors is provided. The method includes periodically transmitting a ping signal from a first base-station, and periodically powering a first node during a frame with a first surge arrester wherein when powered the first node receives the ping signal. The method also includes synchronizing the powering of the first node during the frame with the periodic transmission of the ping signal from the first base-station upon receiving the ping signal at the first node, and transmitting the ping signal from the first node to a second node powered by a second surge arrester upon receiving the ping signal at the first node. The method also includes transmitting the ping signal from the first node to a third node powered by a third surge arrester upon receiving the ping signal at the first node after failure of the second surge arrester, and receiving the ping signal at a second base-station. When the ping signal is received at the second base-station the ping signal includes data related to the failed second surge arrester.

DETAILED DESCRIPTION OF THE INVENTION

Provided is a communication network for monitoring nodes within a chain based network. Wireless sensor nodes with reduced power abilities are placed along the chain based network and receive power from a device in a chain-based network. A first base-station then transmits a ping signal do be received and passed along by the nodes within the system to form a communication route from the first base-station to a second base-station along a group of route nodes. Specifically, the nodes only operate under very low duty cycles. The nodes, due to low power and simpler hardware, have limited communication ranges, and are therefore forced to pass the information, or signals to the second base-station through multiple hops, or communication points between nodes within the system. The nodes vary the times in which they operate to receive the ping signals. Specifically, each node progressively advances to different time slots in a frame in which a ping signal is received until the ping signal is received. When a node receives the ping signal, that node sends an acknowledgement signal back to the first base-station, synchronizes its timing to receive additional future ping signals to join a communication route, and transmits, or forwards, the ping signal to be received either by the second base-station or another node that will become part of the communication route. In particular, as a result of the continuously advancing the time in which a ping signal can be received during a frame until the ping signal is received in a time slot, and then synchronizing to always receive the ping signal during that time slot in a frame, the communication route is formed. When a node in a communication route fails, the ping signal reroutes to an unused node to reform the communication path. When this occurs, the failed node is detected, indicating a potential device failure that has resulted in the node failure.

Figure 1:
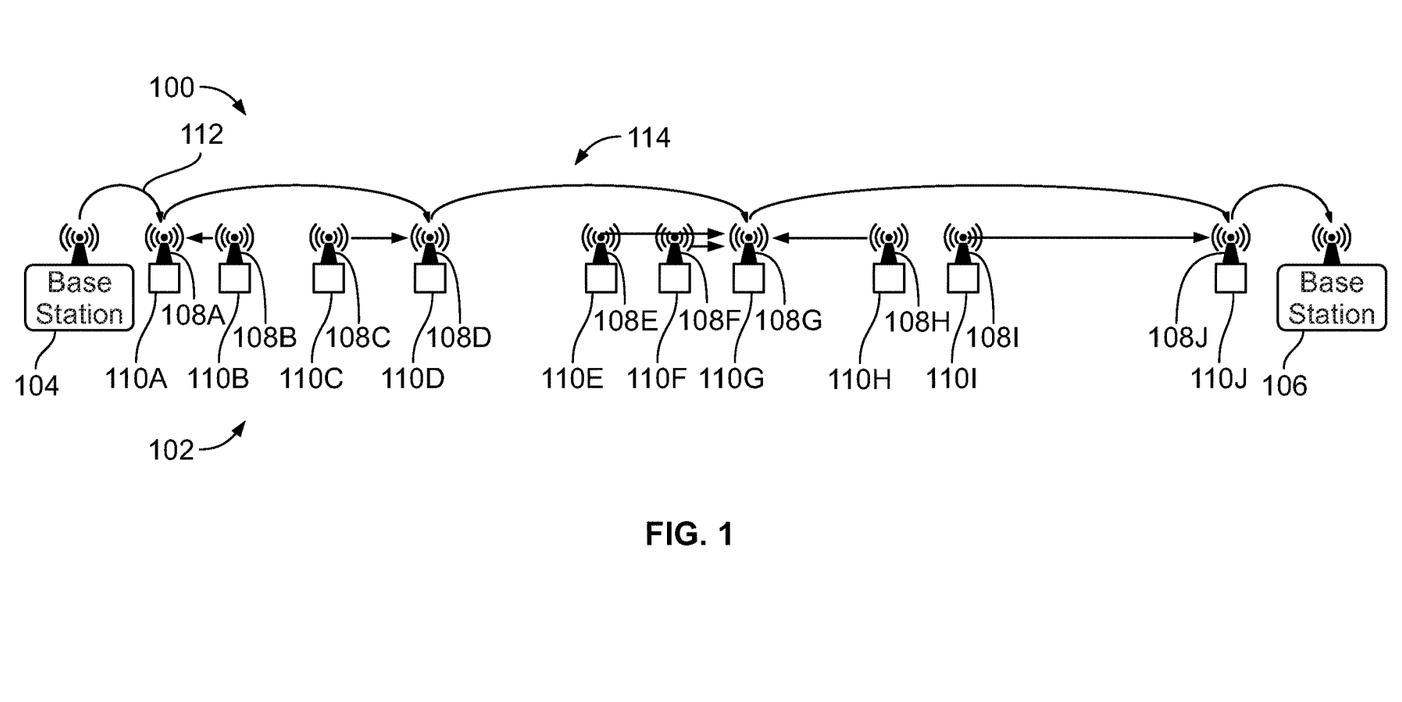
FIG. 1 is a schematic view of a communication network utilized in association with a chain based network in accordance with an exemplary embodiment.

FIG. 1 is a schematic diagram of a communication network 100 used to monitor nodes within a chain-based network 102. The chain based networks can include, power or transmission lines, river/canal networks including on-land and underwater, coastline networks, including on-land and underwater networks, under-water cable networks, road/motorway/highway networks, railways, hill/cliff side networks, street light networks, passing information through a chained low-power satellite network in similar orbits with minimal deviation, or the like.

Each communication network 102 includes a first base-station 104, a second base-station 106, a plurality of nodes 108A-J that are each coupled to a corresponding chain device 110A-J. Each of the first base-station 104 and second base-station 106 include a processor and radio module for making determinations, transmitting, and receiving signals. Similarly, each of the plurality of nodes 108A-J includes a processor and radio module. Also, in an example embodiment each node 108A-J is powered by low leakage power from a corresponding chain device 110A-J. In another example embodiment energy harvesting, or a long term battery are used to power each node. A ping signal 112 is transmitted by the first base-station and a communication route 114 is formed, relaying the ping signal 112 to the second base-station 104. While certain nodes 108A, 108D, 108G, and 108J are within the communication route 114, or are on-route nodes, other nodes 108B, 108C, 108E, 108F, 108H and 108I are not in the communication route 114 and thus are considered non-route nodes. These non-route nodes 108B, 108C, 108E, 108F, 108H and 108I continue to monitor, or attempt to receive the ping signal 112 and are thus backup nodes for when an on-route node 108A, 108D, 108G, or 108J fails as will be described in further detail herein. At that point a non-route node 108B, 108C, 108E, 108F, 108H and/or 108I may become an on-route node, again as will be explained in additional detail herein.

Figure 2:
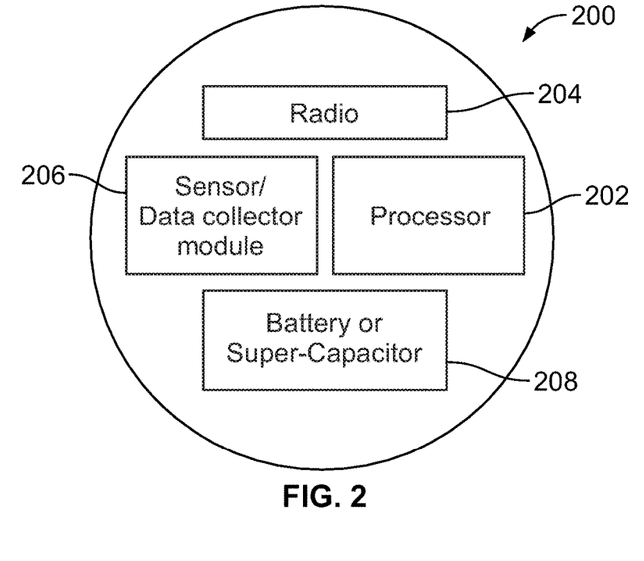
FIG. 2 is a schematic view of a node in accordance with an exemplary embodiment.

FIG. 2 illustrates an exemplary node 200 used to communicate information between a first base-station and a second base-station. In one example embodiment, the node 200 is at least one of the nodes 108A-J of FIG. 1, and the first and second base-stations are the first base-station 104 and second base-station 106 of FIG. 1. The node 200 includes a processor 202, radio module 204 for transmission and reception, data collector module 206 to aggregate data, and a power accumulation module 208. In an example embodiment the processor is a low power microprocessor, so that the node 200 stores a minimal amount of charge. In another example embodiment the power accumulation module 208 is a battery, supercapacitor, or the like. The power required to operate the node 200 can be accumulated through some very low power scavenging, such as in exemplary embodiments of FIG. 1, or by using a battery until the battery is depleted. Specifically, each node 200 in a system is kept at a minimal power such that the base-stations within a system are the only devices able to transmit, or forward, data for use by an individual.

In one example embodiment the data collector module 206 is a sensor that detects ping signals that are transmitted by a base-station. A ping is a signal sent from a first communication device, such as a first base-station to a second communication device, such as a second base-station, to determine the trip time of echoes from the signal that are received back at the transmitting communication device. In this manner communication errors in a line can be detected.

Each processor 202 utilizes an algorithm that determines when a ping has been received and whether to acknowledge the ping, or not acknowledge the ping as potentially back propagation. In this manner a communication route is formed. Because every node has a minimal amount of power and duty cycle, the node only has the ability to listen, or detect a ping, a fraction of time. Each node when manufactured or deployed is predetermined with a time period. Each device on the same network must employ the same time period, or frame. Each frame is split into a number of slots. Based on the power availability and desired duty cycle frame, the time period, or slot size, can be adjusted. Specifically, the power limitation and duty cycle renders each node 200 to be able to listen to only a fraction of the repeating frame.

Figure 3:
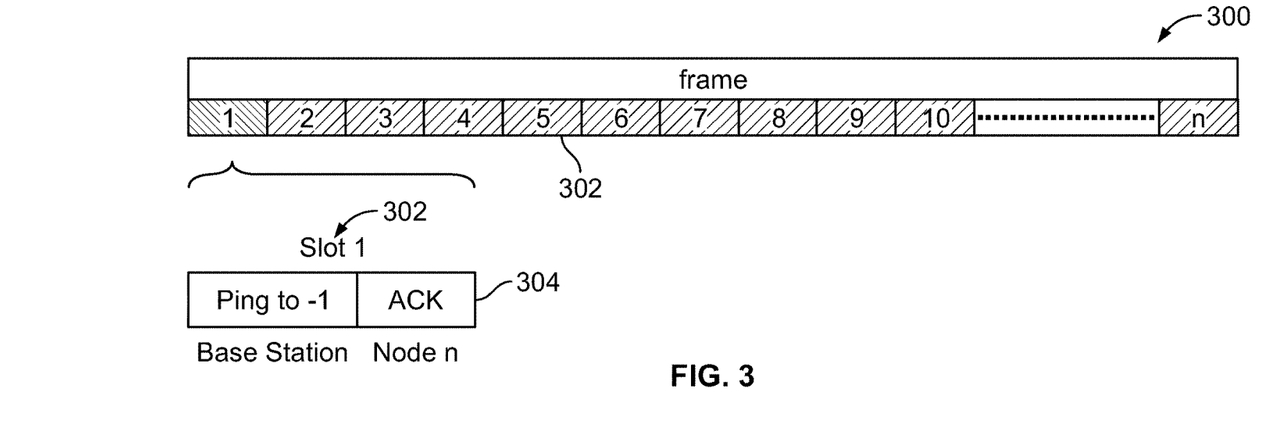
FIG. 3 is a schematic view of a frame in accordance with an exemplary embodiment.

FIG. 3 illustrates a schematic diagram of a frame 300 resulting from a ping being sent through a node between a first base-station and a second base-station. In one example embodiment the first base-station is the first base-station 102 of FIG. 1 while the second base-station is the second base-station 104 of FIG. 1. The frame 300 includes a plurality of time slots 302 disposed between a first base-station and a second base-station where the time slots 302 represent periods of time within a frame 300 the nodes are able to receive a signal through which a communication path is formed between the first base-station and the second base-station. In an example embodiment, each time slot 302 is an equal time, and of long enough duration to receive a ping signal and transmit an acknowledgement signal 304.

Using this topology, a ping signal is able to be transmitted from the first base-station, propagate through the nodes to form a route and be received by the second base-station. In this example embodiment, when a ping sent to a specific node that does not result in an echo, an indication of a node "no hop", or unresponsive node is presented.

Figure 4:
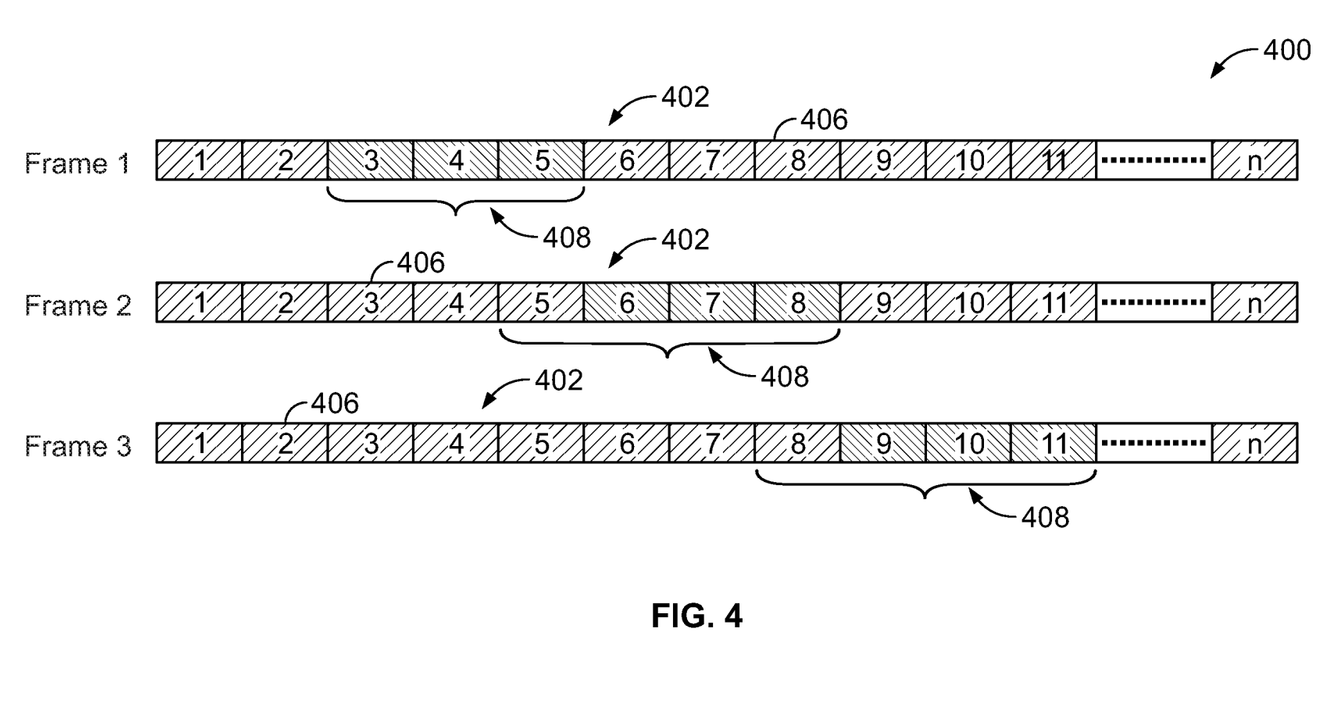
FIG. 4 is a schematic view of a timeslot scheme in accordance with an exemplary embodiment.

As illustrated in FIG. 4, a timeslot scheme 400 that is made up of repeating frames 402 is provided. Having such a scheme helps coordinate networks and minimize clock drift. The scheme also enhances the organization of a route by utilizing timeslots 406 and reducing chances of collisions and interference. In one exemplary embodiment, each timeslot 406 represents the time through which a ping signal is traveling between two nodes. Each interval, or timeslot 406 has enough of a period, or time, for both the ping transmission and an acknowledgement signal back from the node. Therefore, where the route is formed, the ping is provided to a specific destination while where the route is still forming the ping is set to −1 (FIG. 3) meaning a 'no next hop' exists where a node is being unresponsive. As an example, in one configuration based on power and node count requirements, when a timeslot length is 500 ms, there are 400 timeslots 406 in frame 402. Consequently, each frame would be 200 s long.

In the timeslot scheme 400 provided, a number of side-by-side timeslots 406, listen, or are able to receive a ping signal during a frame 402. Then, in a different frame the listing timeslots 406 shift, though still overlap with the timeslots 406 of a previous frame. Specifically, the number of timeslots 406 (four (4) in this exemplary embodiment) that listen during a frame 402 is dependent on the power provided to an individual node. The more timeslots 406 utilized, the faster a signal is received, and a route formed. The overlap of the timeslots 406 in the illustrated frames is required because until a node has locked onto a neighbouring node, the node does not know where a particular timeslot starts and ends in time. Thus, without the overlap, a ping signal from a previous node could be missed if the ping signal is sent close to the boundary.

Additionally, nodes that are waiting to join a 'forming' route cannot be constantly available for the broadcast ping due to power constraints. The nodes therefore are able to detect and receive a ping signal for a small number of timeslots 406. Specifically, the nodes shift this timeslot window 408 each frame 402, and eventually a node that is broadcasting within range during the window receives the ping signal. Put simply, when a first node broadcasts a ping message in a set timeslot 406 in each repeating frame 402, a second node is listening and adjusts the timeslots 406 it be able to receive the ping signal at that time in each frame 402.

Operation and Logic

Nodes are considered to have multiple logic states or processes that they behave according to, and switch between. When nodes are switched on, they begin a process of searching, or have an ability to receive a ping signal. The node then searches for a predetermined amount of time and is switched back to a low power, or a sleep state, after the predetermined amount of time has expired. In this manner, a minimal amount of power is consumed. The next time the node is switched back on, the node again searches for the same predetermined amount of time, only the period in the frame is shifted forward. After repeating this functioning for several iterations, the entire frame is covered throughout multiple searches.

If during a search a node detects a ping signal that specifies no destination, the node considers acknowledging the ping signal. The ping signal is only acknowledged if the node detect activity is below a threshold activity amount in the area during recent searches. Specifically, a count limit (ConLimit) is provided by the node to determine the maximum, or threshold amount of ping signals with a destination that can be acknowledged in a predetermined period. This minimizes the likelihood of the formation of a back propagating route along the node. Thus, when nodes shift their searching schedule forward in a frame, they detect ping signals. Once detected, the node determines whether to acknowledge the ping signal based on the count limit.

Once a ping signal is acknowledged and transmitted, or forwarded, for a next node, the next node now begins to search at the time slot when the ping signal is expected. After the next node receives the ping signal, again, the acknowledgement process occurs. The next node then waits for a globally determined number of time slots and passes on the ping signal. Thus, even when a ping signal is not acknowledged or does not find a node as a result of malfunction, interference or the like, at some point in time a node receives the transmitted ping signal with no destination. Consequently, a next hop is achieved and in the following frame the ping signal is received by a node that acknowledges the ping signal.

When a node is on-route it only searches for a ping signal at the time slot in a frame when it is expecting to receive a periodical ping signal. Once the ping signal is received, the ping signal is acknowledged by the node and passed along for the next node. In between receiving and passing ping signals, during any given time slot each on-route node searches for report signals from other non-route nodes that want to pass a payload. When a ping signal is transmitted, a node is configured to expect to receive acknowledgement from a destined node. Therefore, signals flow through the node. Additionally, each ping signal has an allocated number of bytes. If the bytes are free, the node adds the bytes, or other received accumulated payload to the ping signal before passing the ping signal forward.

In case of failure, in one example embodiment, when a node does not receive the expected ping signal, the node creates a new ping signal at the usual time the node would have sent a ping signal. This enables the rest of the route to be maintained and synchronizes the system as much as possible. Specifically, the node continues auto-pinging until the node does not receive the ping signal a predetermined threshold number of consecutive times. After the predetermined threshold is reached, the node begins searching again.

Alternatively, if the node receives a ping signal at the expected time from another node it updates its previous hop information and accepts it as a valid message. This would be considered as the case where a failed or lost previous hop was replaced by a backup or new node.

When a failure occurs, the node does not hear the expected acknowledgement from a next hop destination a consecutive number of times, causing the node to revert back to a process of presenting a forward ping signal that does not have a destination. When such a node has a settled back-up node, then the node that has a forward ping without a destination updates the next hop of the node to a next node and sends a ping signal to this node to avoid being a failed node in the communication path.

In another example node failure, the node reverts back to a searching process. If the node does not obtain a next hop within specified number, or threshold number of frames, the node sends a drop message to the previous hop. Then the node switches to the process of searching.

When a node receives a drop message, that node switches to the process of transmitting the ping signal with no destination. To overcome synchronization issues, nodes can start receiving signals a predetermined amount of time before a ping signal is expected in order to account for clock drift, and improving the communication path.

Nodes that are not on-route can send their payload in between the ping signals. These nodes are continuously searching for a ping signal and shift their period within the frame, or interval of time when a ping signal is able to be received at the node, until a ping signal is received. Once the ping signal is received the node joins the route node. Therefore, these slots are used as contention slots for any other nodes to pass their payload and potentially become a route node. Specifically, the route nodes have a queue and put the payload messages on the travelling ping signal when there is free space available.

Nodes that are not on the route also can become back-up nodes if certain conditions are met. During normal condition nodes shift their receiving period forward, thus exploring the nearby space. Once a node receives a ping signal from three (3) consecutive route nodes that node becomes a backup node. This node then transmits a signal to the first node of these 3 consecutive nodes to determine if the first node needs to have a back-up for a next hop. The first node in the route then transmits a signal to the backup node to add this backup node as a route node. The non-route node that is backup to the first node now stops shifting and instead only attempts to receive ping signals directed toward the first node to ensure ping signals are received and transmitted along the route. Essentially this enables the non-route, or backup node to replace the failed node in a route without disruption to the communication path.

The first base-station thus forms the ping signal in every frame and transmits the ping signal in the first slot of the frame. Initially, the first base-station transmits the ping signal without a specific destination, or toward a specific node. If acknowledgement is received from a node by the first base-station, the destination of the ping signal is then transmitted to the acknowledging node. The ping signal is then transmitted accordingly as described above. If at any time during the transmission of the initial ping signal the first base-station receives a drop message, or an acknowledgement is not received by the first base-station for a consecutive number of time slots from when the ping signal is transmitted, the first base-station switches back to transmitting a ping signal that does not have a destination.

Meanwhile, the second base-station, or receiving base-station continuously attempts to receive transmitted ping signals that are being routed though the nodes. Once the second base-station receives the initial ping signal, the second base-station, similar to the nodes, transmits an acknowledgment signal back to the first base-station and transmits the ping signal to a next node. In this manner, the second base-station becomes the next hop. Unlike the nodes, the second base-station also transmits data from the initial ping signal to interested parties over a separate communication network. Similarly, the first base-station receives a signal, or data that the initial ping signal has been received by the second base-station.

In an example embodiment, during the transmission and receiving process between the first base-station and second base-station, additional logic can be used to speed-up or improve the process. Specifically, the first base-station can continuously transmit the ping signal until the acknowledgement of the second base-station is received. Then the first base-station can adjust the timing of the transmitted ping signals to generate additional ping signals on the acknowledged time slot in every frame to increase the probability of receipt of the ping signal by the second base-station. In this manner, the first base-station itself adjusts timing of the ping signals instead of forcing the nodes in potential routes to shift their schedules to receive transmission.

In addition, the first base-station can initiate multiple ping signals spaced out in the frame such that other non-route nodes can form parallel routes across the network. This happens without any adjustment to the nodes as they simply respond to the received ping signal begin receiving signals. In this manner, a non-route node may be substituted in to increase the transmission time between the first base-station and the second base-station.

All of the nodes are predetermined within a period because each node periodically attempts to receive the ping sign a fraction of total time the ping signal is being transmitted. Additionally, individual nodes can phase-shift within the frame in which the node attempts to receive the ping signal. Consequently, the nodes are not required to initiate transmissions, thus saving the amount of power consumed by each node. Instead, nodes only respond to received ping signals and react to them. In one example, when a node receives a ping signal, or packet of data, that has no destination, the node acknowledges the ping signal, transmitting the acknowledge signal back to a transmitting base-station or node. When a node receives a ping signal that is specifically addressed to the node, the node becomes part of the route. Therefore, after acknowledging the ping signal, the node also transmits this ping signal further to a predetermined amount of time slots. Once a node has transmitted the ping signal and receives an acknowledgement signal, that node becomes fully integrated into the route having both previous and next hop information. Using this logic, a route is formed when a number of nodes are deployed, and the first base-station initiates the beginning of the ping signals and the second base-station receives the end ping signal.

Specifically, the system includes at least two (2) base-stations on each end of a communication path. The first, or transmitting base-station, initiates the ping signal periodically within every frame. Therefore, when nodes shift the period in which they are able to receive the ping signal, the nodes shift to ensure that node along a route will receive the ping signal. Each node that receives the ping signal then joins the route and transmits the ping signal in an attempt to find a next hop, or node until the ping signal reaches the second, or receiving base-station.

During this process, to enable nodes to form the route quickly and efficiently, constraints are provided for acknowledging the ping signal. When a node shifts their period for receiving a ping signal, the node is able to receive all messages passed within a communication chain, in addition to the ping signal. This includes acknowledgment and ping signals that are back propagating through the communication chain. Thus, in an example embodiment of a count limit, or conlimit, which is utilized to limit the number of signals a node responds to during a predetermined time period or time interval. Thus, once a ping signal is received during the interval, even if additional signals are received, the node does not respond to the additional signal, or signals exceeding the count limit threshold to minimize back propagation of a ping signal. This also minimizes and can avoid any lock-ups where if for a number of periods, referred to as a frameout, the node does not manage to find a next hop, the node drops from the route by transmitting a drop signal instead of an acknowledgment signal.

Once a route is formed, a payload signal is parsed in a predetermined space in each ping signal, or packet to maximize data transfer. Nodes that are not on the route use the time slot immediately after a ping signal is received with the destination of this slot dedicated for contention. When a node receives the payload signal and is on the route, the node places payload in queue and in some examples enhances the payload signal of the ping signal.

Additional nodes, or backup nodes may be added to the system to increase route forming efficiency. In particular, in areas where a chain based network lacks working devices and the chain based network is sparse in the area, additional nodes can be added to the communication network in these areas to increase efficiency and ensure a communication route is always formed. Thus, additional efficiencies are provided.

Overall, the routes are created using a travelling communication signal that in one example is a ping signal. A payload signal is parsed by adding it to the free space on the travelling ping signal. Once organized, the operation becomes very predictable. The first base-station initiates the ping and the nodes that are on-route pass this ping forward. These nodes also then synchronize on the expected ping. Therefore, the ping signal travels through the network and reaches the second or receiving base-station which then collects the data and transmits the data to interested parties.

Nodes that are not on route then pass information, or signals, in contention slots of the frame, in between time slots of the frame designated for the ping signal. These non-route nodes also sync on the ping signal. Therefore, all the nodes only need to follow another node in close proximity to synchronize regardless of position or identification the close proximity node. Due to the response to a failed node and actions that the failed node takes, auto-recovery from failures occurs with and without backup nodes. Still, use of the back up nodes still enhances the speed at which the system can recover from a failed node.

Figure 5A:
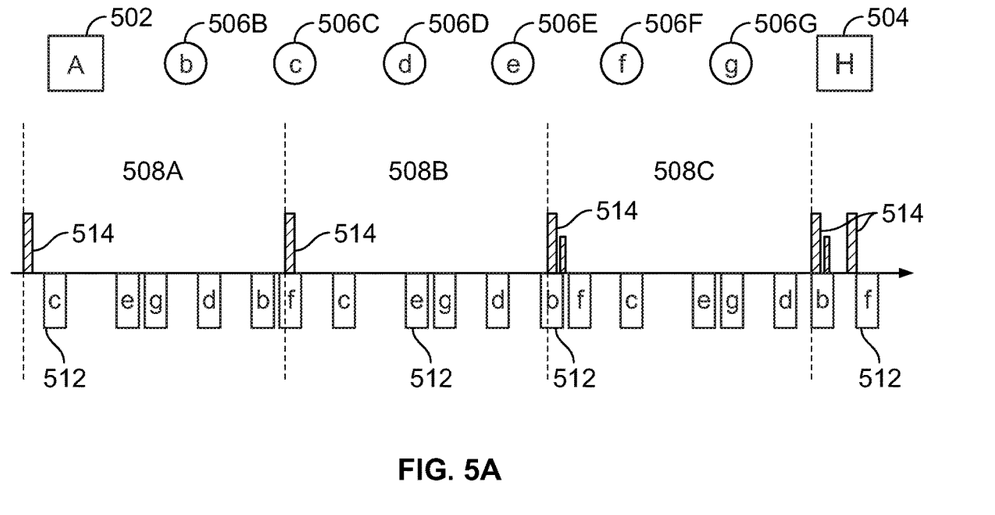
FIG. 5A is a schematic view of a communication network in accordance with an exemplary embodiment.
Figure 5B:
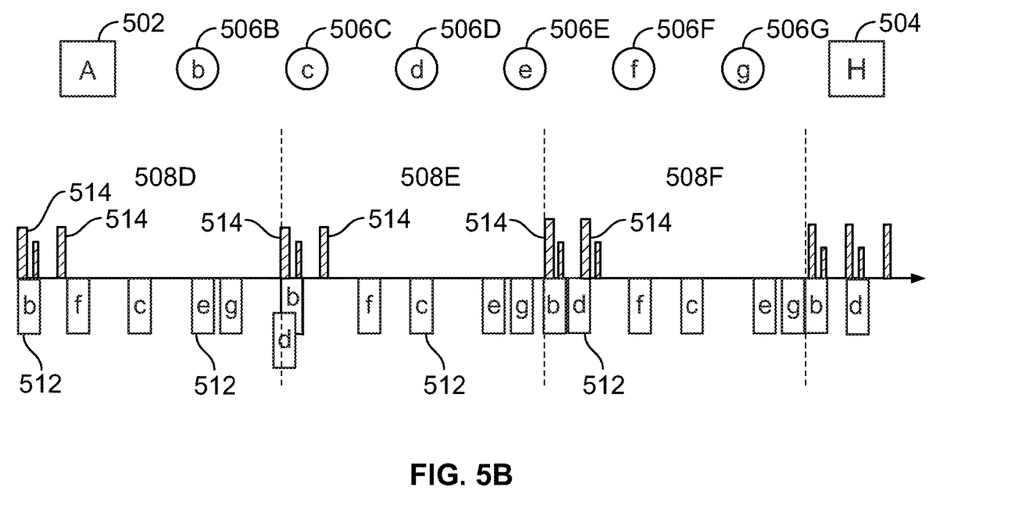
FIG. 5B is a schematic view of a communication network in accordance with an exemplary embodiment.
Figure 5C:
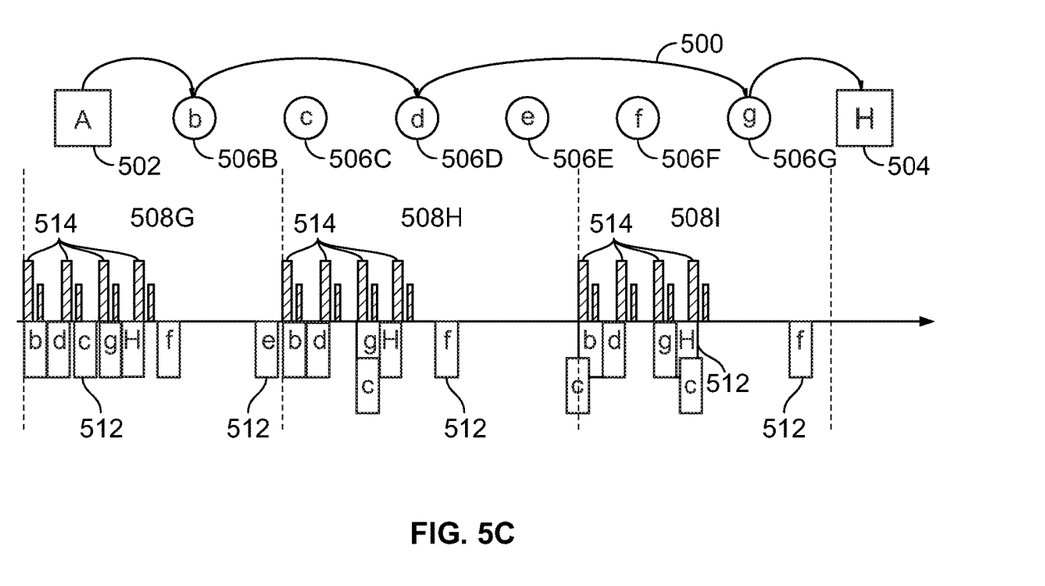
FIG. 5C is a schematic view of a communication network in accordance with an exemplary embodiment.

FIGS. 5A-5C schematically illustrate how a communication path 500 (FIG. 5C) is formed between a first base-station 502 and a second base-station 504 through a plurality of nodes 506B-G positioned between the first base-station 502 and second base-station 504. Each FIG. 5A-5C illustrates a series of frames 508A-I wherein a period of time passes from concurrent frame starts 510A-510I. Thus, the width 512 of each illustrated node 506B-G represents a period of time during each individual frame 508A-H a node 506B-G is operating to receive a ping signal 514.

With reference to FIG. 5A, in a first frame 508A the ping signal 514 is transmitted from the first, or transmitting, base-station 502; however, no node 506B-G is in an operational state to receive the transmitted ping signal 514. Consequently, no acknowledgment is received.

As time passes, the first base-station 502 continues providing a ping signal 514, only with the passage of time, the periods during which the nodes 506B-G are able to receive the ping signal has moved in the second frame 508B. In this second frame 508B the fifth node 506F is able to receive a ping signal 514 during the time the first base-station 502 transmits the ping signal 514; however, physically, the fifth node 506F is too far a distance from the first base-station 502 to receive the signal. Thus again, no acknowledgement is received.

During the third frame 508C the nodes again have changed periods in which they each are able to receive the ping signal 514. At this time the first node 506B is able to receive the ping signal 514 at a time the ping signal 514 is transmitted. Additionally, the first node 506B is in range of the first base-station 502, consequently, the first node 506B receives the ping signal 514 and sends an acknowledgement signal back to the first base-station 502. At this time, the first node 506B recognizes the receipt of the ping signal 514 and continues to operate to receive the ping signal 514 at the time the first base-station 502 transmits the ping signal 514. In this manner, the first node 506B synchronizes with the transmission of the ping signal 514 by the first base-station 502, joining or becoming part of the communication route. In addition, as the first node 506B receives the ping signal 514, in addition to sending the acknowledgment signal, the first node 506B also transmits, or forwards, the ping signal 514 to be received by another node 506C-G within receiving range and operating to receive the ping signal 514 at a time the first node 506B is transmitting the ping signal 514. Meanwhile, the other nodes 506C-G continue to vary the period in which they receive the ping signal 514 to receive the transmitted ping signal 514.

During the fourth and fifth frames 508D and 508E, the first node 506B continues to transmit the ping signal 514 with no other nodes 506C-G able to receive the ping signal 514 at the time the ping signal 514 is transmitted. Then during the sixth frame 508F, the third node 506D is able to receive the ping signal 514 at the time the ping signal 514 is transmitted from the first node 506B. Consequently, the third node 506D receives the ping signal 514, transmits an acknowledgement signal back to the first node 506B, synchronizes its receiving period to receive the ping signal 514 from the first node 506B, and transmits the ping signal 514 for another unknown node 506 E-G. In this manner, the second node 506C has been skipped and the third node 506D joins, or becomes part of the communication route.

During the seventh frame 508G, the sixth node 506G is able to receive the ping signal 514 at the time the ping signal 514 is transmitted from the third node 506D. Consequently, the sixth node 506G receives the ping signal 514, transmits an acknowledgment signal back to the third node 506D, synchronizes its receiving period to receive the ping signal 514 from the third node 506D, and transmits the ping signal 514 to the second base-station 504 to complete the route. In this manner, both the fourth node 506E and fifth node 506F are skipped and the route formed is from the first base-station 502, to the first node 506B, then third node 506D, then the sixth node 506G, and finally to the second base-station 504. Then, as illustrated by the eighth and ninth frames 508H and 508I these skipped nodes continuously change their period to receive the ping signal 514 in case a new route is to be formed.

Figure 5D:
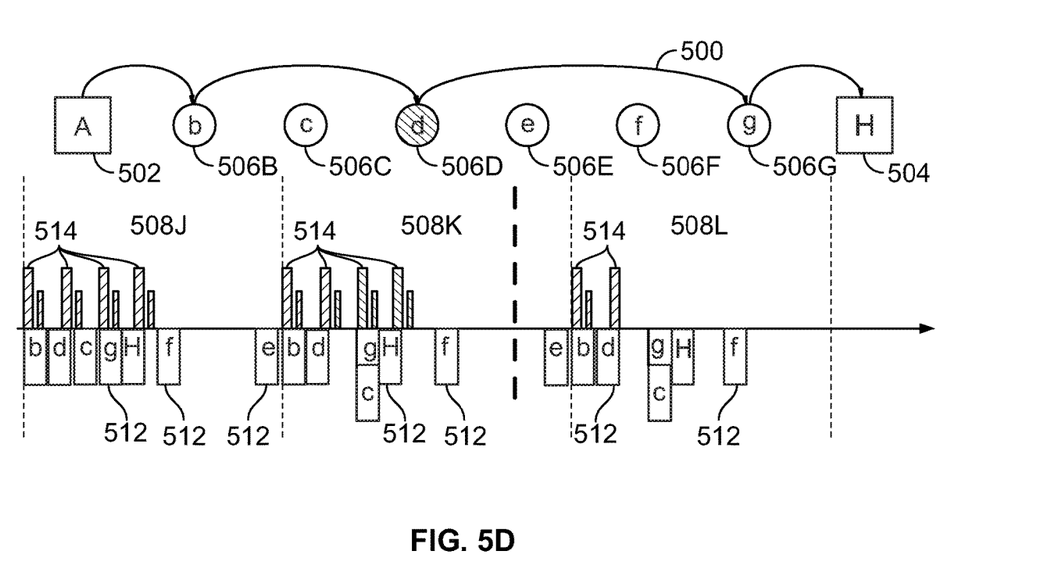
FIG. 5D is a schematic view of a communication network in accordance with an exemplary embodiment.
Figure 5E:
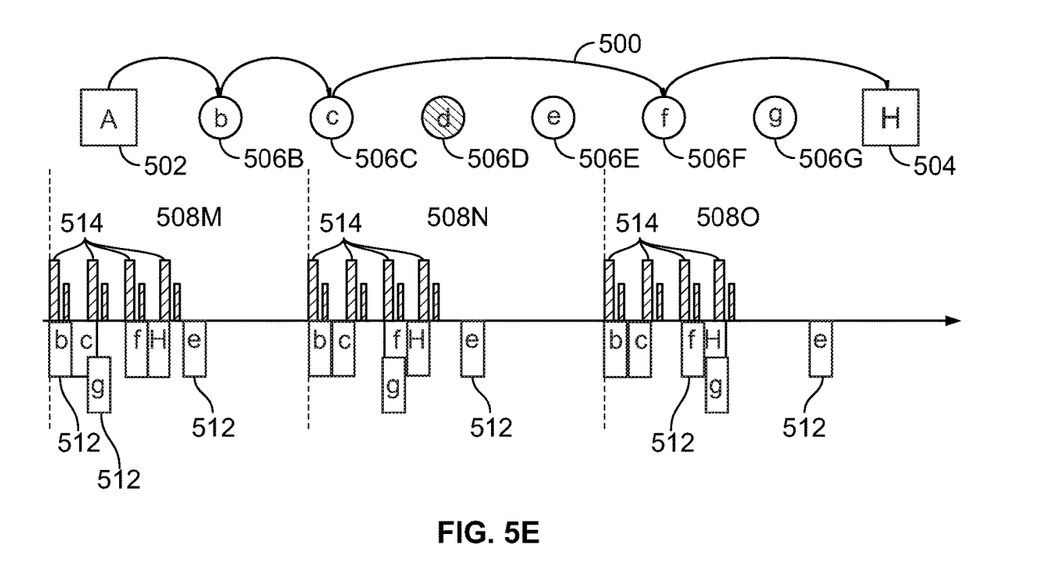
FIG. 5E is a schematic view of a communication network in accordance with an exemplary embodiment.

FIGS. 5D and 5E schematically illustrate how the communication path 500 illustrated in FIGS. 5A-5C is reconfigured when one of the nodes in the route fails. Specifically, frames 508J-0 illustrate this process.

At the tenth frame 508J, the communication path continues similar to that illustrated in the eighth and ninth frames 508H and 508I with the skipped nodes continuously changing their period or receipt in the frame attempting to receive the ping signal 514. At the eleventh frame 508K, the third node 506D fails to transmit the ping signal 514 to the sixth node 506G. The sixth node 506G remains with the same receiving period for a predetermined period of time in an attempt to continue to receive the ping signal 514 from the third node 506D. After this time lapses, at the twelfth frame 508L, the first node 506B stops transmitting the ping signal 514 to the third node 506D and attempts to transmit the ping signal 514 to a new node. At the thirteenth frame 508M (FIG. 5E) the second node 506C receives the ping signal 514 and has transmitted the ping signal to the fifth node 506F that then transmits the ping signal 514 to the second base-station 504. Thus, the new route is from the first base-station 502, then to the first node 506B, second node 506C, fifth node 506F, and to the second base-station 504. Thus, as illustrated in the fourteenth frame 508N, and fifth tenth frame 508O, the fourth node 506E and sixth node 506G now continuously change periods attempting to receive the ping signal 514. Thus, when a node fails, the communication path 500 reroutes and this rerouting is reported at the first base-station 502 and second base-station 504, such that in example embodiments when a node is part of a piece of equipment such as a surge arrester, a check can be made to physically see if the arrester has failed, causing the node failure. This permits early detection of such malfunctioning equipment.

To ensure non-route nodes such as fourth node 506E and the sixth node 506G in the example of FIG. 5E are not malfunctioning as well, these nodes send signals as frequently as possible under the limit of the throughput capability of the network. Thus, each non-route node records the time passed since the last signal, or report transmitted, and once the time exceeds the pre-defined report period the node sends a signal immediately after receiving the ping signal 514. This signal/report mechanism performs well in relatively sparse networks because the contention level is low.

In dense networks, because many non-route nodes can receive the same ping signal 514 and report after that, the probability of collision significantly enhances. Therefore, a contention management mechanism is utilized to prevent these signal collisions, thereby improving the report success rate. Specifically, reinforcement learning (RL) is applied to the contention control so that each node learns from the history of successful/collided transmissions and determines the most appropriate time to report.

There are three basic concepts of RL, the actions, the weights and the rewards. In this particular application, the actions are defined as non-route node signals, or reports received within a certain time slot. Each action has an associated weight which represents the credibility of selecting this action. The weights are updated by the rewards, which are the results after taking certain actions, that in one example is report successes/failures. The weights can then be given a maximum value to save memory space.

In one example embodiment, to ensure the non-route nodes have repeatable actions, the non-route node continue to be able to receive the ping signal in the same four (4) time slots once a ping signal is received rather than moving forward four (4) time slots every frame, until the node does not receive the ping signal in consecutive frames. This is referred to as a route frameout, or a route quiet. This change allows the non-route node to contend with other nodes to report to the same on-route node repeatedly and periodically.

Figure 6:
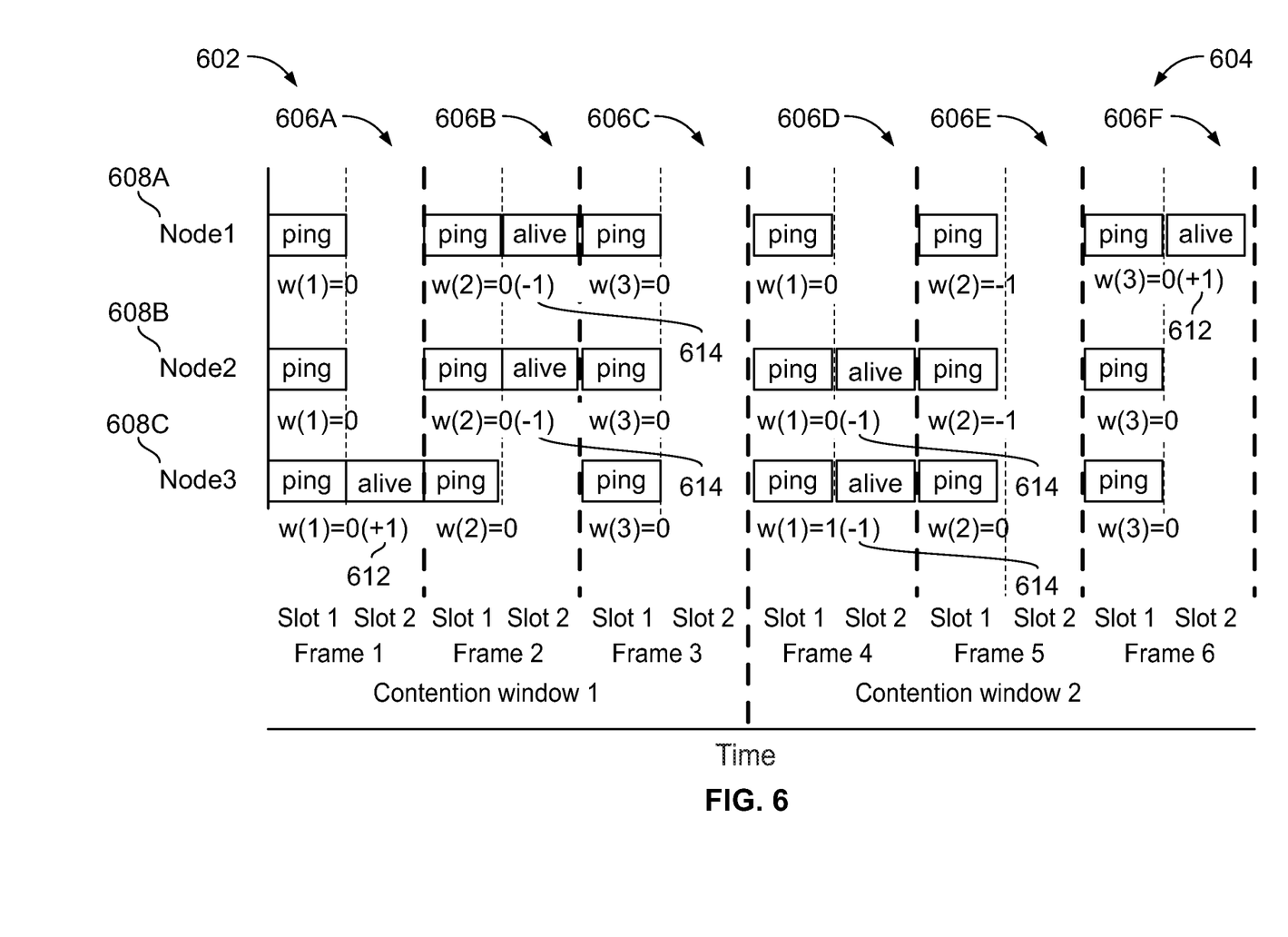
FIG. 6 is a schematic view of contention windows in accordance with an exemplary embodiment.

In another example embodiment as illustrated in relation to FIG. 6, a first contention window 602 and second contention window 604 are utilized. Specifically, the first contention window 602 and second contention window 604 control the contention level and allows one non-route node to report once every certain number of frames 606A-F.

In the example embodiment of FIG. 6 there are three non-route nodes 608A-C trying to report to the same on-route node (not shown). The first contention window 602 is configured to three frames 606A-C. The actions are defined as a non-route node reporting in one of the three frames 606A-C. The node's action in the first contention window 602 is determined at the beginning of the first contention window 602 according to the weights of the three actions. The action with the largest weight is selected or a random action is selected if there are multiple actions associated with the largest weight.

In the first contention window 602 the weights of three actions of all three non-route nodes 608A-C are initialized to 0. So, in the first contention window 602, the ping signal transmissions are equivalent to random access. The third non-route node 608C has successfully reported in the first frame 606A so the associated weight w(1) of the third non-route node 608C are updated by the reward +1 612. The first non-route node 608A and second non-route node 608B have both randomly selected the second frame 606B to report, or send a signal, causing collisions and consequently both the first non-route node 608A and second non-route node 608B receive −1 rewards 614.

In the second contention window 604, the non-route nodes 608A-C select the frames 606D-F to report based on the updated weighs. For the first non-route node 608A the fifth 606E is not selected because w(2) has the lowest weight, so the first non-route node 608A randomly selects the sixth frame 606F to report and the report is successful. The second non-route node 608B has the same weights as the first non-route node 608A and in the second contention window 604 randomly selects the fourth frame 606D to report. The third non-route node 608C continues using the same frame to report because w(1) has the largest weight but this time collides with the second non-route node 608B and they both receive the −1 reward 614. The RL algorithm continues updating the frames 606A-F to report, or provide a signal, based on the transmission history and after time the probability the non-route nodes 608A-C finding collision-free frames to report greatly enhances. While described utilizing two contention windows with six frames in this exemplary embodiment, to ensure there are enough frames within a contention window for the nodes to contend, the contention window size is configured based on the density of the network and can increase or decrease in size.

Because in the exemplary embodiment of FIG. 6 time is needed for the non-route nodes 608A-C to converge to provide collision-free reports, and the time varies according to the contention window size. Therefore, the exemplary embodiment of FIG. 6 effectively builds one-hop clusters across the network, where each cluster includes an on-route node and non-route nodes report to this on-route node. Therefore, the clusters enable the application of centralized control at the on-route nodes to improve the convergence time.

Specifically, the non-route nodes perform the same RL algorithm as presented in relation in FIG. 6 with slightly different rewards. Once a non-route node gets its first successful report, the on-route node reserves the current frame for this non-route node by including its ID or MAC address in the next ping signal. Once a non-route node receives a ping signal with its ID, the associated weight receives a +10 reward, indicating that the current frame is reserved for itself. If the non-route node receives a ping signal with the ID of another node, it receives a −1 reward and does not contend in the slot after this ping signal. If the current frame is not yet reserved to any non-route node, the on-route node includes 0 as the node ID, indicating that this frame is free to contend, and the non-route nodes which receive this 0 ID receive a +1 reward to increase the probability that non-route node contends in this frame. The on-route node then can release a reserved frame if the on-route node does not receive the report in a certain number of consecutive contention windows.

This methodology significantly improves the time each non-route node needs to find a frame for collision-free reports at the cost of payload space in a ping signal to send the node ID/MAC. However, the methodology does not affect the report of successful rates when the network converges to a steady state. Therefore, the methodology may be discontinued after convergence to release the space in the ping packets. Thus, improved signal routing in dense networks is provided, with minimal loss of payload space.

Thus, presented is a system and method for a nodes that are able to discover, receive, and transmit ping signals to neighboring, or short range, nodes and base stations that effectively form a route across extremely low duty cycled chain network, and provide self-organization and self-repair abilities. Over time a failed node is replaced automatically with a new node as a result of frame-outs and new route organization. The logic provided is simple, easy to use, and implement. In addition, the system and method simplifies node operation.

Such a method utilizes ping signals with phase-shifting, conlimits, frameouts, simple backing-up, recovery, and the like to form an improved communication network. Additionally, without any adjustments, by introducing additional ping signals, multiple parallel routes can be formed either way of the communication chain. This increases both robustness, fault-tolerance and throughput. Consequently, when such a network is utilized in example embodiments where a failed device, such as a surge arrester need to be identified, the change in the network route identifies the failed arrestor, saving time, and cost in identifying failures, allowing quick repair. Thus, an improved network is provided.

Figure 7:
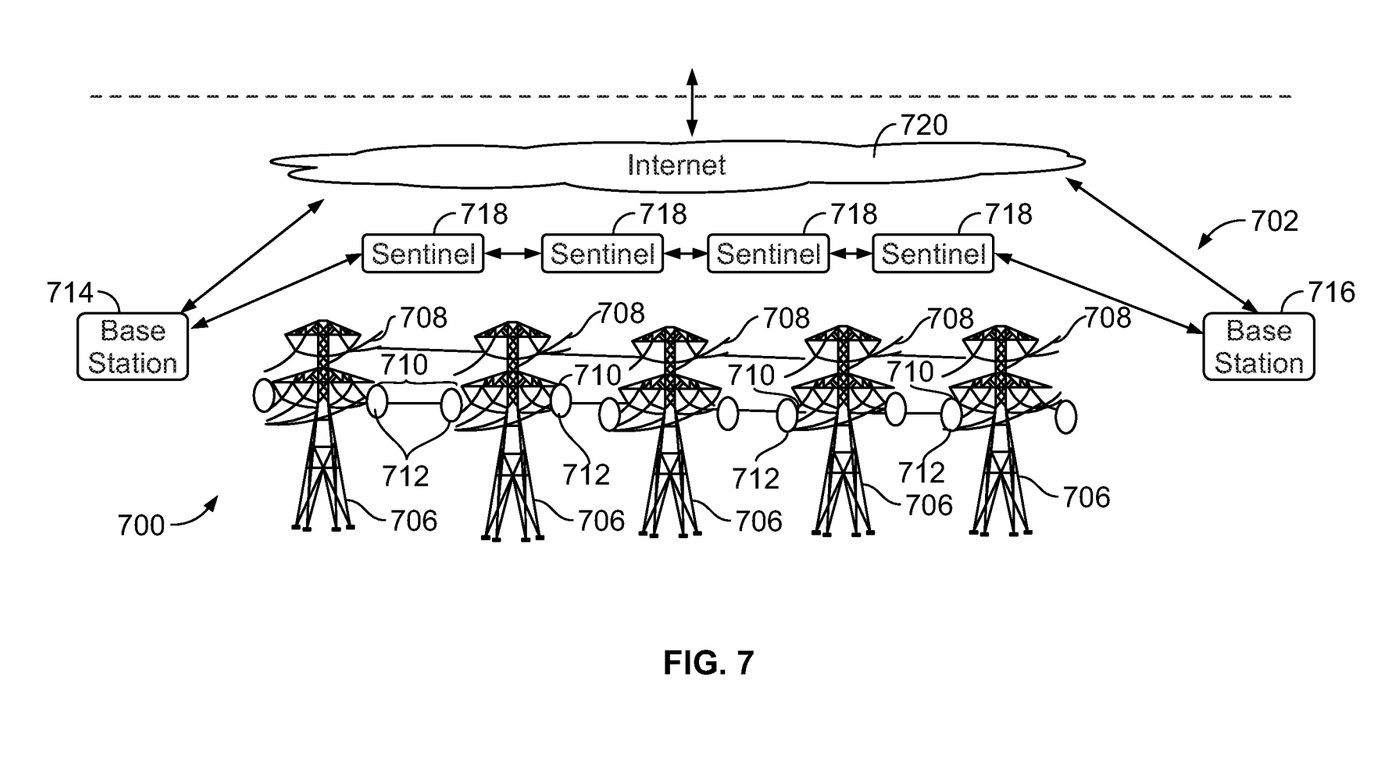
FIG. 7 is a schematic view of a communication network utilized in association with a chain based network in accordance with an exemplary embodiment.

FIG. 7 illustrates an exemplary embodiment of a transmission line system 700 utilizing a communication network 702 to identify malfunctioning working devices within the transmission line system.

The transmission line system 700 includes transmission towers 706, transmission lines 708, surge arresters 710, and surge arrester disconnects 712. The communication network includes a first base-station 714, second base-station 716, and a plurality of nodes 718, wherein each node is coupled to a surge arrester 710 such that each node is powered by the surge arrester 710. In one example leakage power from a corresponding surge arrester 710 powers each node 718. In this manner, when a surge arrester 710 fails, the corresponding node similarly loses power and disconnects from the communication path.

While in an exemplary embodiment a transmission line system is provided, in other embodiments river/canal networks including on-land and underwater, coastline networks including on-land and underwater, under-water cable networks, road/motorway/highway networks, hill/cliff side networks, street light networks, passing monitoring information through a chained low-power satellite networks in similar orbits with minimal deviation, or the like utilize the communication network 702.

In operation, the first base-station 714 and second base-station 716 each have receivers and transponders for detecting and receiving radio waves and transmissions, including wireless transmissions from the internet of things 720, WiFi, Cellular networks, microwaves, satellite, or the like. Alternatively, transmissions are transmitted and received over a wired communication network via ethernet, fiber optic cables, or the like. Specifically, the first base-station 714 communicates, transmits, and receives data and information from the second base-station 716. While only a first base-station 714, and a second base-station 716 are illustrated, within a transmission line system 700, numerous base-stations may be provided as needed. Additionally, each of the first base-station 714 and second base-station 716 are many miles away from the nearest transmission towers 706 and apart from one another.

The transmission towers 706 in one example are generally metal lattices that receive the transmission lines 708 such that the transmission lines 708 extend between the transmission towers 706. In example embodiments, the distance between a first transmission tower 706 to a final transmission tower of a transmission line system 700 can range between five (5) miles and five-hundred (500) miles. Similarly, the distances between individual towers 706 can also vary. In one example, the transmission line system 700 includes transmission towers 706 that are clustered, or have an increased density, around areas having increased population levels. So, in areas of increased population, the distance between individual towers 706 is decreased, or less than the distance between individual towers 706 when population is decreased or less than an area. Specifically, the distance between transmission towers is inversely proportional to the amount of individuals located in a five mile radius from two successive transmission towers 706.

The transmission lines 708 are generally metal cables extending between the transmission towers 706. In one example, the transmission lines 708 are high voltage powerlines having at least 100,000 volts and in another example the voltage of the transmission lines 708 are in a range between 100,000 volts and 800,000 volts.

The surge arresters 710 are placed on the transmission lines 708 at each of the transmission towers 706 to provide protection against over-current conditions by shorting the over-current into the ground. A surge arrester disconnect 712 is connected to each surge arrester 710 in order to provide additional protection for when a surge arrester 710 fails. When failure or malfunction of the surge arrester 710 occurs and current attempts to flow through the surge arrester disconnect 712, the surge arrester disconnect 712 prevents damage as a result of a surge and blows apart to provide visual evidence of a malfunctioning or failed surge arrester 710.

The nodes 718 interact with the first base-station 714 and second base-station 716 in the communication network 702 as described above. Thus, route nodes provide a communication path between the first base-station 714 and second base-station 716. When a surge arrester 710 fails, the corresponding node 718 receiving power from the surge arrester 710 fails because the node 718 is no longer receiving power. The communication route reforms as described above through a backup node. The first base-station 714 and second base-station 716 transmit the failed node to individuals that can ensure the surge arrester 710 related to the failed node is checked and replaced. Consequently, the failed arrester 710 is immediately detected, minimizing the time for recognizing malfunctioning and decreasing replacement time.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A communication network for monitoring node state within a chain based network comprising:
   a first base-station including a processor and a radio configured to transmit a ping signal;
   a plurality of nodes each including a processor and a radio configured to receive the ping signal, transmit an acknowledgement signal upon receipt of the ping signal, and transmit the ping signal;
   a second base-station including a processor and a radio configured to receive the ping signal and transmit data related to the plurality of nodes based on the ping signal;
   wherein each of the plurality of nodes is further configured to be coupled to a corresponding working device of a chain based network;
   wherein each of the plurality of nodes is further configured to cease operation when the corresponding working device of the chain based network ceases operation;
   wherein at least one of the first base-station or second base-station is configured to transmit a communication that a node has failed responsive to the working device ceasing operation causing the node ceasing operation;
   wherein at least one node includes a power accumulation module that powers the at least one node; and
   wherein the power accumulation module is configured to receive leakage power from a working device coupled to the at least one node.

2. The communication network of claim 1, the plurality of nodes including a first node, a second node, and a third node, wherein a first communication route from the first base-station to the second base-station includes the first node and second node and does not include the third node.

3. The communication network of claim 1, wherein at least one node includes a data collector module that is configured to add data to the ping signal prior to the at least one node transmitting the ping signal.

4. The communication network of claim 1, wherein the first base-station is configured to transmit the ping signal periodically over a period of a frame.

5. The communication network of claim 4, wherein the frame includes a plurality of time slots.

6. The communication network of claim 5, wherein at least one node is configured to receive the ping signal in varying time slots of the frame.

7. The communication network of claim 1, wherein the working device is a surge arrester.

* * * * *